United States Patent
Bouzidi (10) Patent No.: US 7,929,469 B2
(45) Date of Patent: Apr. 19, 2011

(54) METHOD AND HYBRID CIRCUIT FOR ATTENUATING NEAR-END CROSSTALK IN A BIDIRECTIONAL SIGNAL TRANSMISSION

(75) Inventor: Jean-Pierre Bouzidi, Lannion (FR)

(73) Assignee: Alcatel-Lucent, Paris (FR)

( * ) Notice: Subject to any disclaimer, the term of this patent is extended or adjusted under 35 U.S.C. 154(b) by 92 days.

(21) Appl. No.: 12/386,288

(22) Filed: Apr. 16, 2009

(65) Prior Publication Data
US 2009/0270039 A1    Oct. 29, 2009

(30) Foreign Application Priority Data
Apr. 24, 2008 (EP) .................................. 08290397

(51) Int. Cl.
*H04B 3/20* (2006.01)
(52) U.S. Cl. ........ 370/288; 370/286; 370/201; 379/394; 379/398; 379/406.1
(58) Field of Classification Search .................. 370/201, 370/286, 288; 379/398, 406.1, 402; 455/63.1, 455/67.13
See application file for complete search history.

(56) References Cited

U.S. PATENT DOCUMENTS

| | | | | |
|---|---|---|---|---|
| 4,358,643 A | * | 11/1982 | Levy | 379/402 |
| 4,715,064 A | * | 12/1987 | Claessen | 379/392 |
| 6,618,480 B1 | * | 9/2003 | Polley et al. | 379/406.05 |
| 2003/0123650 A1 | * | 7/2003 | Ouyang | 379/406.01 |
| 2005/0018596 A1 | * | 1/2005 | Washburn et al. | 370/201 |
| 2005/0088958 A1 | * | 4/2005 | Abel et al. | 370/201 |
| 2005/0094583 A1 | * | 5/2005 | Gupta et al. | 370/286 |
| 2009/0092036 A1 | * | 4/2009 | Peeters et al. | 370/201 |

FOREIGN PATENT DOCUMENTS
WO    WO 03/058842 A1    7/2003
* cited by examiner

*Primary Examiner* — Ricky Ngo
*Assistant Examiner* — Rasheed Gidado
(74) *Attorney, Agent, or Firm* — Carmen Patti Law Group, LLC (57) ABSTRACT

The present invention relates to a method for attenuating near-end crosstalk between a remote received signal and a locally transmitted signal in a bidirectional signal transmission wherein said method comprises the step of producing an analog automatic feedback-driven correction loop in order to provide a no-correlation between said transmitted and received signals and to a hybrid circuit for enabling said method.

16 Claims, 6 Drawing Sheets

METHOD AND HYBRID CIRCUIT FOR ATTENUATING NEAR-END CROSSTALK IN A BIDIRECTIONAL SIGNAL TRANSMISSION

BACKGROUND OF THE INVENTION

The present invention relates to the field of communication and, more specifically, to the design of hybrid circuits and crosstalk cancellation techniques in bidirectional transmission.

The implementation of bidirectional transmission means allows to increase significantly the capacity of a communication system and therefore to bring a huge interest to the companies dealing with communication networks and to communication service providers. Nevertheless, the use of such transmission means implies to deal with additional technical problems. One of the main problems, in the case of a wire transmission, is the crosstalk phenomenon appearing at the ends of said wire and causing the degradation of said signals. Indeed, as the same wires are used to transmit and receive signals, some means must be employed to separate the strong near-end transmitted signal from the weaker far-end received signal. Circuits designed to separate the received signal from the transmitted signal are referred to as hybrid circuits.

Figure 1:
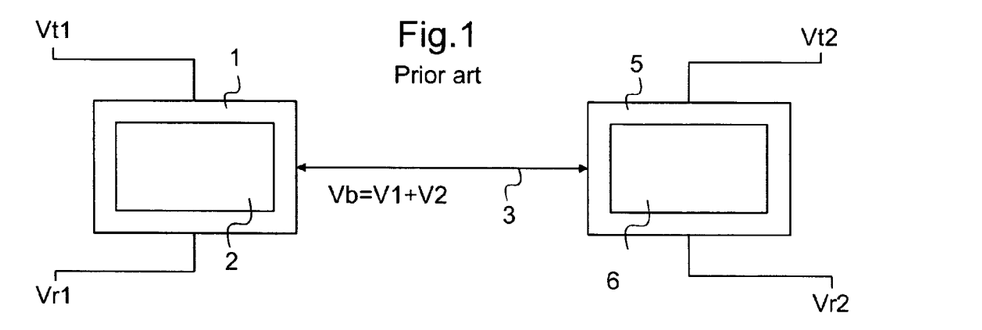
FIG. 1 is a block diagram representing a bidirectional transmission between two hybrid transceivers according to the state of the art.

FIG. 1 illustrates a wire connection between two hybrid transceivers. A first hybrid transceiver 1 comprising a hybrid circuit 2 generates and transmits a first signal V1 (V1 corresponds to the data signal Vt1 to be transmitted) and receives a different signal V2 (V2 corresponds to the signal Vt2 generated and transmitted from a remote hybrid transceiver 5) on the same wireline 3.

In order to obtain the signal voltage Vr1 corresponding to the received signal V2, the hybrid transceiver 1 needs only to subtract its generated and transmitted signal V1 from the hybrid signal Vb (Vb=V1+V2) on the wireline 3.

In the same way, the second hybrid transceiver 5 having a hybrid circuit 6 transmits the signal Vt2 and retrieves the signal Vr2 corresponding to V1.

Figure 2:
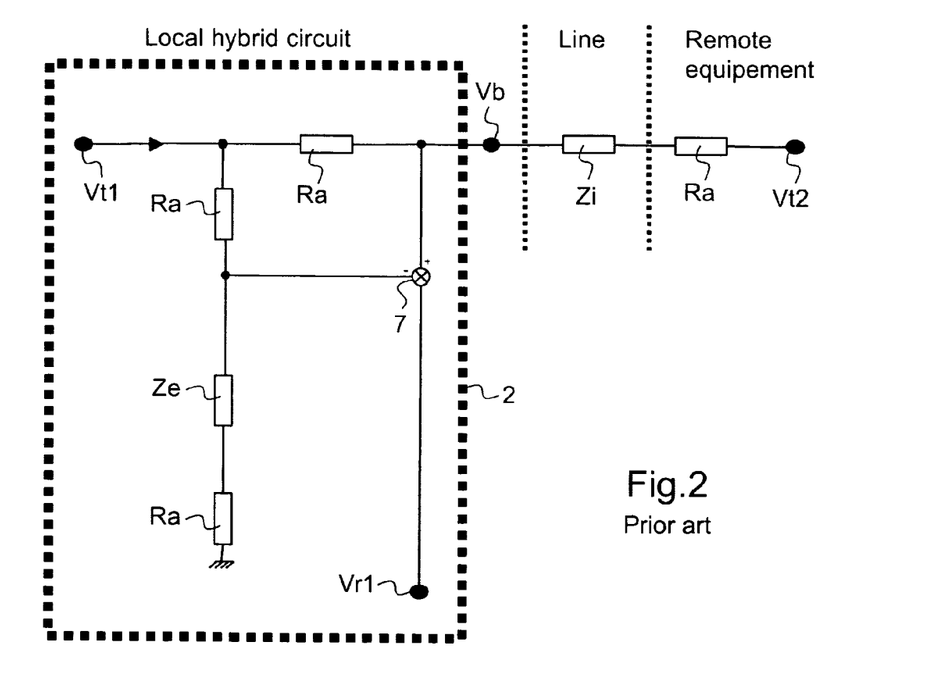
FIG. 2 is a block diagram of an embodiment of a hybrid transceiver according to the state of the art.

Such operation to separate the transmitted and received signals is for example carried out by a hybrid circuit according to the state of the art as presented in FIG. 2.

The hybrid signal Vb corresponding to V1+V2 is coupled to the positive input of a subtracter 7 whereas a signal corresponding to V1 is coupled to the negative input in order to retrieve a signal corresponding to the received signal V2 on the output Vr1.

The impedance values of the different analog components (Ra, Ze) are chosen with respect to the line impedance (Zi).

The main problem is that the impedance of these components are fixed whereas the line impedance Zi of the line may vary a lot depending on transmission parameters (length of the line, wireline type, . . . ). In such cases, the separation of the transmitted and the received signals is imperfect leading to residual contributions of the transmitted signal in the received signal which is known as Near-end crosstalk (NEXT). Near-end crosstalk (NEXT) results therefore from transmitting and receiving different interfering signals on a wireline 3. The wireline said above comprises the media such as twisted pair (TP), coaxial link, microstrip or stripline on printed board.

In order to improve signal transmission, either a compromise has to be found on said transmission parameters or adjustments on the components of the local hybrid equipment have to be made. In most cases, the adjustment is done once during manufacturing, then this adjustment has to allow having enough margin to take into account the derating of environment parameters like for example values of temperature or supply. A more complex approach proposes techniques using digital adaptive filter that have been developed. However, to determine the coefficient of these filters, said techniques require external dedicated calculators and are, therefore, expensive and difficult to implement.

SUMMARY OF THE INVENTION

One object of the present invention is to overcome the precited drawbacks of the state of the art and provide a method and a hybrid circuit for attenuating near-end crosstalk in a bidirectional signal transmission.

The present invention provides for a method for attenuating near-end crosstalk between a remote received signal and a locally transmitted signal in a bidirectional signal transmission wherein said method comprises the step of producing an analog automatic feedback-driven correction loop in order to provide a no-correlation between said transmitted and received signals.

Preferentially, the step of producing an automatic feedback-driven correction loop comprises the step of creating an amplitude corrected first feedback loop estimate of said locally transmitted signal.

According to another aspect of the invention, said amplitude corrected first feedback loop estimate of said transmitted signal is subtracted from a hybrid signal in order to retrieve said remote received signal.

According to a further aspect, the step of producing an automatic feedback-driven correction loop comprises the step of creating a phase corrected second feedback loop estimate of said transmitted signal depending on the amplitude corrected first feedback loop estimate.

Advantageously, said phase corrected second feedback loop estimate of said transmitted signal is used for impedance adjustment.

The inventions provide further for a hybrid circuit for attenuating near-end crosstalk between a remote received signal and a locally transmitted signal in a bidirectional signal transmission comprising
  an input node for signals to be transmitted to a remote equipment,
  an output node for signals received from a remote equipment,
  a hybrid input/output node for receiving and transmitting signals from and to a remote equipment,
  a circuit linked to said input, output and hybrid input/output nodes and configured to couple the input node to the hybrid input/output node and to couple the hybrid input/output node to said output,
wherein said circuit comprises an analog automatic feedback driven correction loop to provide a no-correlation between said transmitted and received signal.

According to one aspect of the invention, said input node is coupled, on one hand, to the hybrid input/output node via an output resistor and, on an other hand, to ground via a voltage divider, the voltage divider having a first branch with a first branch resistor and a second branch coupled to ground and presenting in series a resistor of said second branch and an adjustable impedance component; said hybrid circuit also comprises:
  a first feedback loop comprising
    first and second inputs coupled respectively to a connection node between said first and second branches of said voltage divider and to the hybrid input/output node, and an output coupled to the negative input of a main subtracter, the positive input of said main subtracter being coupled to the hybrid input/output node and the output of said main subtracter being coupled to said output node of said hybrid circuit, a second feedback loop comprising
  a first input, a second input and third input coupled respectively to the output of the first feedback loop, the input node and to the hybrid input/output node, and
  an output coupled to the control input of the adjustable impedance component.

Preferentially, the adjustable impedance component comprises a capacitor in series with a first resistor, both being in parallel with a second resistor, said first and second resistors being connected to ground; a first connection point being located between said first resistor and capacitor; said adjustable impedance component also comprises a multiplier with two inputs, one coupled to a second connection point, located between the second branch resistor of said voltage divider and the adjustable impedance component, and the other one being the control input of said adjustable impedance component coupled the output of said second feedback loop, the output of said multiplier being coupled to said first connection point.

According to a further aspect of the invention, said first feedback loop comprises a subtracter
  having its positive input coupled to the output of a first multiplier via a first average operator; the inputs of said first multiplier are respectively coupled to said connection node between said first and second branches of said voltage divider and said hybrid input/output node,
  having its negative input coupled to the output of a second multiplier via a second average operator; the inputs of said second multiplier are coupled respectively to said connection node between said first and second branches of said voltage divider and to a third multiplier having its inputs coupled to said connection node between said first and second branches of said voltage divider and to the output of said subtracter via a constant operator; the output of said third multiplier being the output of said first feedback loop.

Advantageously, said second feedback loop comprises a subtracter
  having its negative input coupled to the output of a first multiplier via a first average operator; the inputs of said first multiplier are respectively coupled to the hybrid input/output node and to the input node of said hybrid circuit via a delay operator;
  having its positive input coupled to a second multiplier via a second average operator; the inputs of said second multiplier are coupled respectively to the output of said first feedback loop and to the input node of said hybrid circuit via said delay operator; the output of said subtracter is coupled to the input of a constant operator; the output of said constant operator is the output of said second feedback loop.

Alternatively, said first feedback loop comprises a subtracter having its positive input coupled to said hybrid input/output node and its negative input coupled to the output of a first multiplier; the output of said subtracter is coupled to the first input of a second multiplier whereas the second input of said second multiplier is coupled to said connection node between said first and second branches of said voltage divider; the output of said second multiplier is coupled to a constant operator via an average operator; the output of said constant operator is coupled to the first input of said first multiplier whereas its second input is coupled to said connection node; the output of said first multiplier is also the output of said first feedback loop.

According to another alternative said second feedback loop comprises a subtracter having its positive input coupled to the output of said first feedback loop and its negative input coupled to said hybrid input/output node; the output of said subtracter is coupled to the first input of a multiplier whereas the second input of said multiplier is coupled to the input node of said hybrid circuit via a delay operator; the output of said multiplier is coupled to a constant operator via an average operator; the output of said constant operator is also the output of said second feedback loop.

DETAILED DESCRIPTION OF THE INVENTION

As used herein, the term "analog component" refers to component that do not imply any software treatment, software processing means or else. They are built for example by resistors, capacitors, transistors, logical gates . . . .

As used herein, the term "multiplier" refers to an analog component providing on its output a signal corresponding to the multiplication of signals connected to its inputs.

As used herein, the term "subtracter" refers to an analog component providing on its output a signal corresponding to subtraction of a signal connected to its negative input from a signal connected on its positive input.

As used herein, the term "average operator" refers to an analog component providing on its output a signal corresponding to the average value over a period T $$\left(1/T \int_0^T e(t)\,dt\right)$$

of a signal e(t) varying in time t and connected to its input.

As used herein, the term "delay operator" refers to a component providing on its output a signal corresponding to the signal connected to its input delayed of a predetermined value. The said delay could be done for example by analog component (delay transmission line) or by digital component (serial latches D clocking the signal). This delay is introduced by the multiplication to a signal of the form $e^{-i\phi}$, where i represent the imaginary constant and $\phi$ the phase of the signal.

As used herein, the term "constant operator" refers to an analog component providing on its output a signal corresponding to the multiplication of the signal connected to its input by a specific constant.

The arrows present on the different block diagrams represent wire connections and the direction of the arrows correspond to the direction of the signals transmitted on said wires.

The present invention refers to a hybrid circuit allowing, on one hand, to transmit a first signal on a bidirectional connection and, on the other end, to receive a second signal different from said first signal on the same bidirectional connection while attenuating as much as possible crosstalk between both signals.

Figure 3:
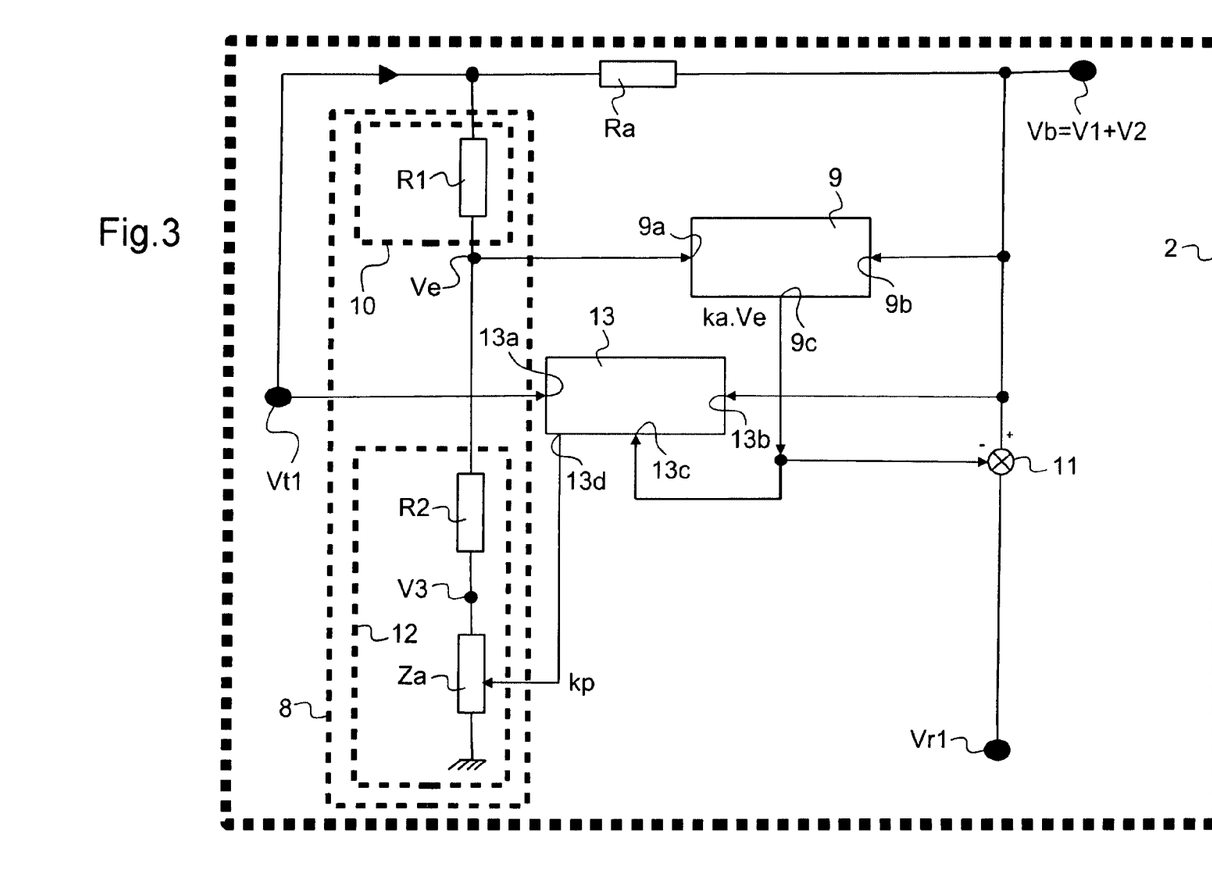
FIG. 3 is a block diagram of a hybrid transceiver according to the present invention.

A general block diagram of a hybrid circuit for attenuating near-end crosstalk between a remote received signal and a locally transmitted signal in a bidirectional signal transmission is shown in FIG. 3. The circuit comprises three connection nodes to transmit or receive external signals:
  an input node Vt1 for signals to be transmitted to a remote equipment,
  an output node Vr1 for signals received from a remote equipment,
  a hybrid input/output node Vb for receiving and transmitting signals from and to a remote equipment.

The hybrid input/output node Vb corresponds to the connection point with a network via a bidirectional connection.

The hybrid input/output node Vb is linked to a bidirectional connection for receiving and transmitting signals from and to a remote equipment. When a signal needs to be transmitted to said remote equipment, this signal is sent to the input Vt1. When a signal is received from said remote equipment, this received signal is transferred on the output Vr1 and is transmitted, for example, to non-represented processing means.

The hybrid circuit 2 comprises further a circuit linked to said input, output and hybrid input/output nodes and configured to couple the input node to the hybrid input/output node and to couple the hybrid input/output node to said output node.

The hybrid circuit 2 comprises advantageously only analog components which are organized as follow:

The input node Vt1 is coupled, on one hand, to the hybrid input/output node Vb via an output resistor Ra and, on an other hand, to ground via a voltage divider 8.

The voltage divider has a first branch 10 with a first branch resistor R1 and a second branch 12 coupled to ground and presenting in series a second branch resistor R2 and an adjustable impedance component Za with a control input adapted to receive a signal corresponding to a phase in order to allow an impedance adjustment of the circuit 2. The value of the components used in the adjustable impedance component Za are chosen according to the parameters of the line and to its different length met in the application, and according to the bandwidth of the signal transmitted in order to allow for the adjustable impedance component Za to be close from the behaviour of the impedance line Zi on the bandwidth of said transmitted signal.

According to one aspect of the invention, the hybrid circuit 2 comprises a first feedback loop 9 comprising first 9*a* and second 9*b* inputs coupled respectively to a connection node Ve between said first 10 and second 12 branches of said voltage divider 8 and to the hybrid input/output node Vb.

The output of the first feedback loop 9*c* is coupled to the negative input of a main subtracter 11. The positive input of said main subtracter 11 is coupled to the hybrid input/output node Vb and the output of said main subtracter 11 is coupled to said output node Vr1 of the hybrid circuit 2.

This first feedback loop 9 is designed to create an amplitude estimate ka·Ve of the signal V1 transmitted to a remote equipment through Vb.

According to a further aspect of the invention, the hybrid circuit 2 comprises a second feedback loop 13 comprising a first input 13*c*, a second input 13*a* and third input 13*b* coupled respectively to the output 9*c* of the first feedback loop 9, the input node Vt1 and to the hybrid input/output node Vb.

The output 13*d* of said second feedback loop 13 is coupled to the control input of the adjustable impedance component Za.

This second feedback loop 13 is designed to create a phase estimate kp of the signal V1 transmitted to a remote equipment through Vb. This phase estimate is fed to the adjustable impedance component Za in order to adapt automatically without any software processing means the impedance of the hybrid circuit.

It has to be noted that the feedback loops are interwoven. As a consequence, both feedback loops depend and influence each other.

Thus with respect to the prior art, the hybrid circuit described in FIG. 3 comprises in addition an adjustable impedance component Za and two feedback loops 9 and 13 for respectively creating an amplitude estimate and a phase estimate.

Figure 4:
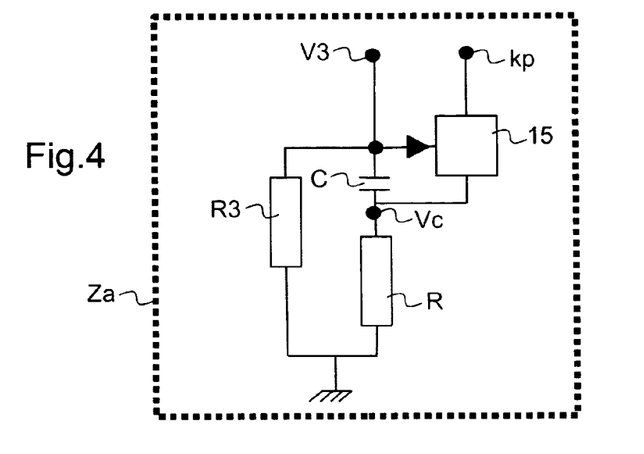
FIG. 4 is a block diagram of a possible embodiment of an adjustable impedance component according to the present invention.

One possible embodiment of realization of the adjustable impedance component Za is shown in FIG. 4.

More specifically, the adjustable impedance component Za comprises a capacitor C in series with a first resistor R, both being in parallel with a second resistor R3. Said first and second resistors are connected to ground and a first connection point Vc is located between said first resistor R and capacitor C.

The adjustable impedance component Za also comprises a multiplier 15 with two inputs, one coupled to a second connection point V3, located between the second branch resistor R2 of said voltage divider and the adjustable impedance component Za, and the other one being the control input of said adjustable impedance component Za coupled the output 13*d* of said second feedback loop. The output of said multiplier 15 is coupled to said first connection point Vc between the capacitor C and first resistor R.

The impedance component Za is therefore connected to the output 13*d* of the second feedback loop 13 for receiving the phase estimate kp.

Figure 5:
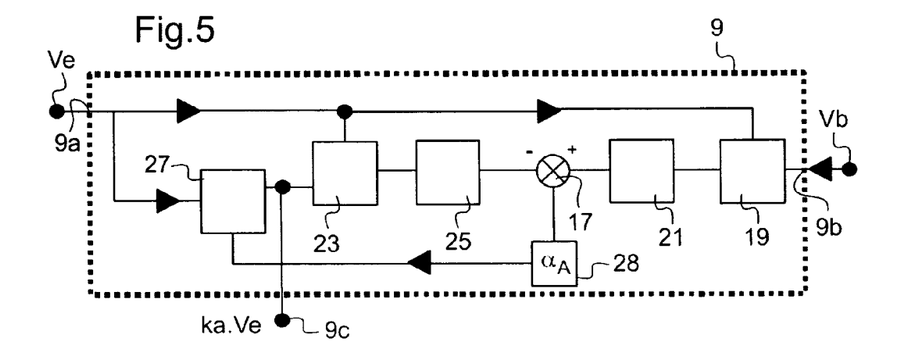
FIG. 5 is a block diagram of a first embodiment of a feedback loop allowing to create a corrected amplitude estimate according to the present invention.

Referring to FIG. 5 showing a first embodiment of the first feedback loop 9.

Said first feedback loop 9 comprises a subtracter 17 having its positive input coupled to the output of a first multiplier 19 via a first average operator 21. The inputs of said first multiplier 19 are respectively coupled to said connection node Ve between said first 10 and second 12 branches of said voltage divider 8 and said hybrid input/output node Vb.

The negative input of subtractor 17 is coupled to the output of a second multiplier 23 via a second average operator 25. The inputs of said second multiplier 23 are coupled respectively to said connection node Ve between said first 10 and second 12 branches of said voltage divider 8 and to a third multiplier 27 having its inputs coupled to said connection node Ve between said first 10 and second 12 branches of said voltage divider 8 and to the output of said subtracter 17 via a constant operator 28. The output of said third multiplier 27 is the output 9c of said first feedback loop 9.

Figure 6:
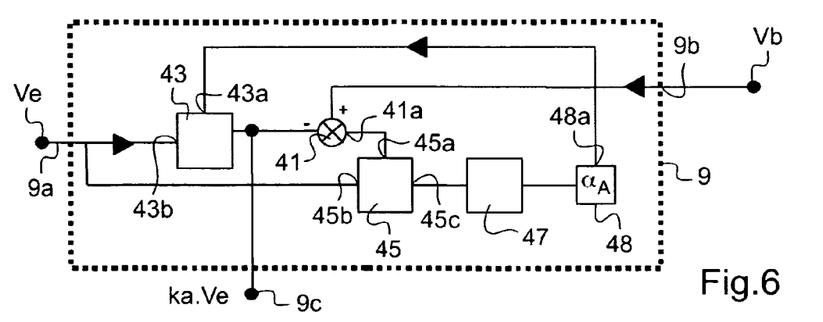
FIG. 6 is a block diagram of a second embodiment of a feedback loop allowing to create a corrected amplitude estimate according to the present invention.

A second embodiment of said first feedback loop 9, requiring less analog components, is shown in FIG. 6.

This alternate solution of said first feedback loop 9 comprises a subtracter 41 having its positive input coupled to said hybrid input/output node Vb and its negative input coupled to the output of a first multiplier 43.

The output 41a of said subtracter 41 is coupled to the first input 45a of a second multiplier 45 whereas the second input 45b of said second multiplier 45 is coupled to said connection node Ve between said first 10 and second 12 branches of said voltage divider 8.

The output 45c of said second multiplier 45 is coupled to a constant operator 48 via an average operator 47 and the output 48a of said constant operator 48 is coupled to the first input 43a of said first multiplier 43 whereas its second input 43b is coupled to said connection node Ve between said first 10 and second 12 branches of said voltage divider 8. The output of said first multiplier 43 is also the output 9c of said first feedback loop 9.

Figure 7:
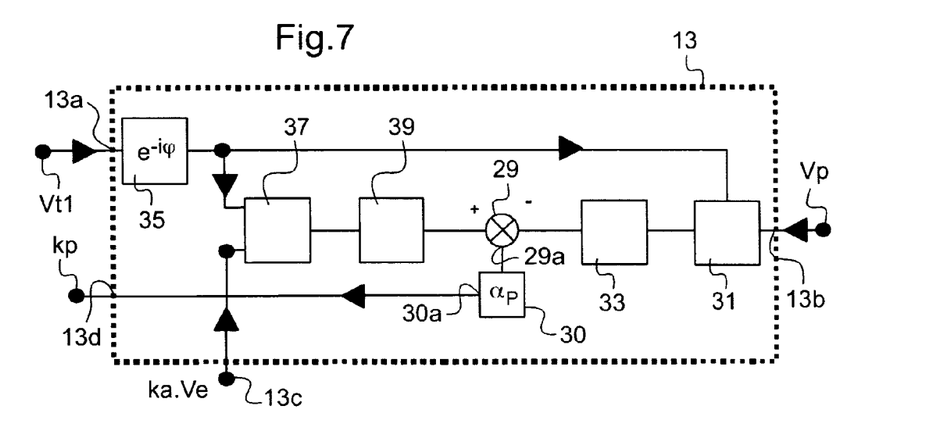
FIG. 7 is a block diagram of a first embodiment of a feedback loop allowing to create a corrected phase estimate according to the present invention.

A first embodiment of the second feedback loop 13 is described in details in FIG. 7.

Said second feedback loop 13 comprises a subtracter 29 having its negative input coupled to the output of a first multiplier 31 via a first average operator 33. The inputs of said first multiplier 31 are respectively coupled to the hybrid input/output node Vb and to the input node Vt1 of said hybrid circuit 2 via a delay operator 35. The value of the delay is a fraction of the period of the signal. To be efficient, this value has to be greater than the delay between the signal at the output node Vr1 and the signal at the hybrid input/output node Vb. A preferred value could be a quarter of a period of the signal.

The positive input of the subtracter 29 is coupled to a second multiplier 37 via a second average operator 39. The inputs of said second multiplier 37 are coupled respectively to the output 9c of said first feedback loop 9 and to the input node Vt1 of said hybrid circuit 2 via said delay operator 35. The output of said subtracter 29 is coupled to the input of a constant operator 30.

The output 30a of said constant operator 30 is the output 13d of said second feedback loop 13 and is therefore coupled to the control input of Za.

Figure 8:
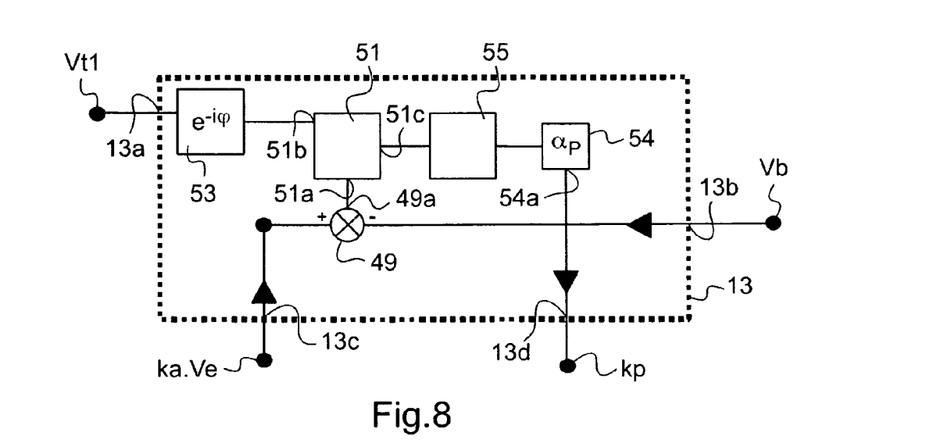
FIG. 8 is a block diagram of a second embodiment of a feedback loop allowing to create a corrected phase estimate according to the present invention.

A second embodiment of said second feedback loop 13, requiring less analog components, is shown in FIG. 8.

This alternate solution of the second feedback loop 13 comprises a subtracter 49 having its positive input coupled to the output 9c of said first feedback loop 9 and its negative input coupled to said hybrid input/output node Vb. The output 49a of said subtracter 49 is coupled to the first input 51a of a multiplier 51 whereas the second input 51b of said multiplier 51 is coupled to the input node Vt1 of said hybrid circuit 2 via a delay operator 53.

The output 51c of said multiplier 51 is coupled to a constant operator 54 via an average operator 55. The output 54a of said constant operator 54 is also the output 13d of said second feedback loop 13 and is therefore coupled to the control input of Za.

Figure 9:
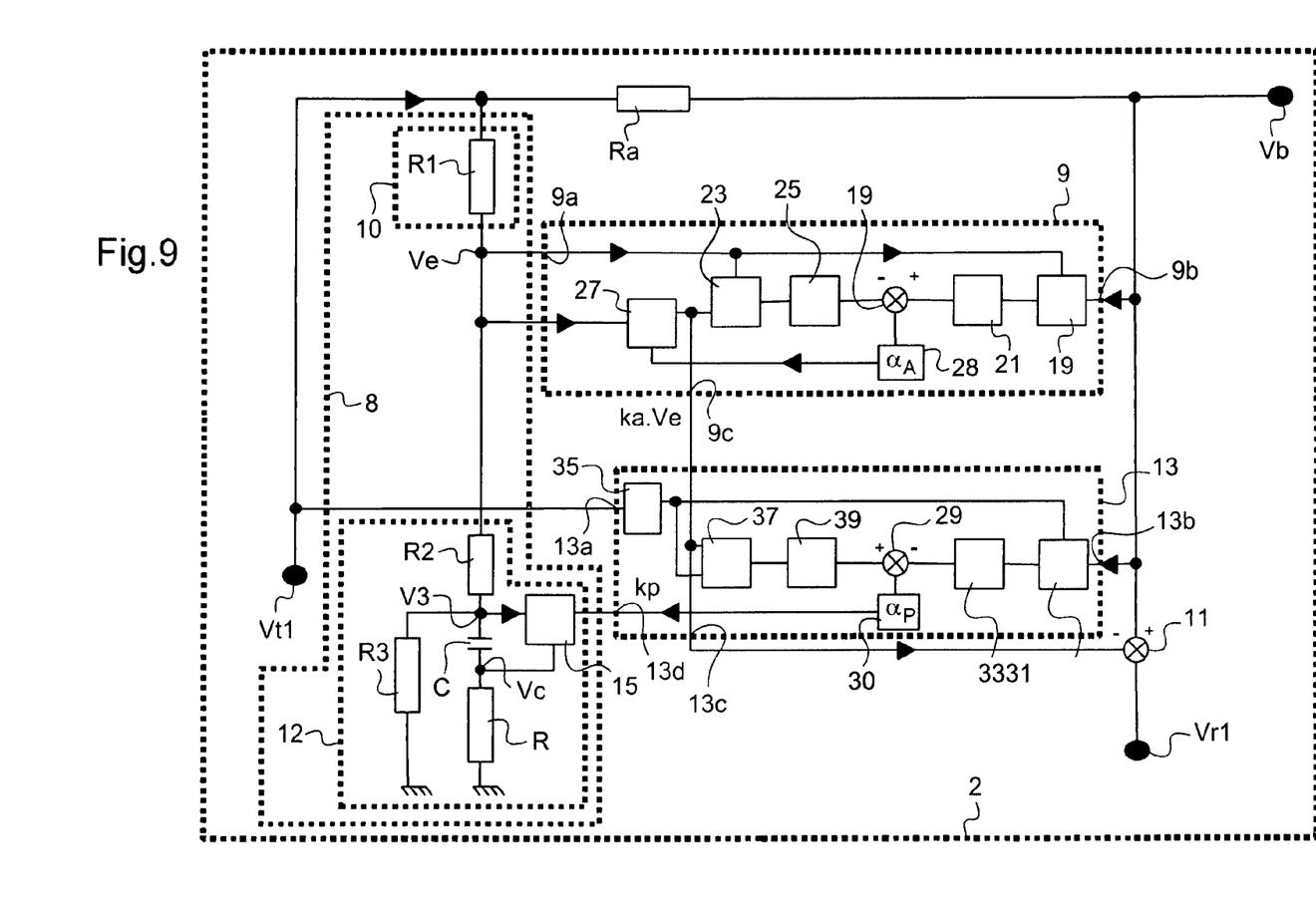
FIG. 9 is a block diagram of a first possible embodiment of a hybrid circuit according to the present invention showing the details of the hybrid circuit.

FIG. 9 shows a global view of a first configuration of a hybrid circuit according to the present invention having as first feedback loop 9 the circuit of FIG. 5 and as second feedback loop 13 the circuit of FIG. 7.

Figure 10:
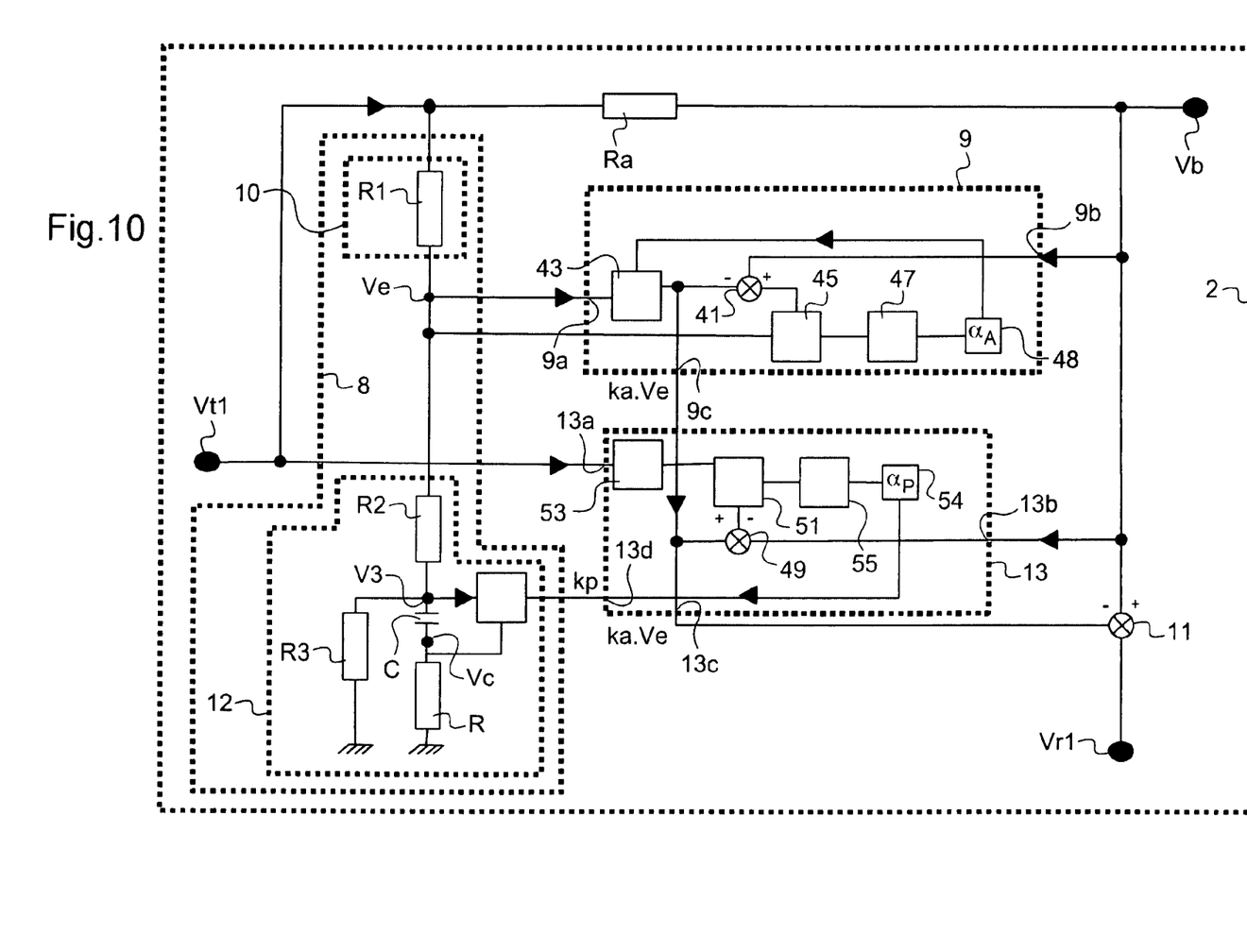
FIG. 10 is a block diagram of a second possible embodiment of a hybrid circuit according to the present invention showing the details of the hybrid circuit.

FIG. 10 shows a global view of a second preferred configuration of a hybrid circuit according to the present invention having as first feedback loop 9 the circuit of FIG. 6 and as second feedback loop 13 the circuit of FIG. 8. This configuration is preferred because it requires less components and is therefore less expensive.

It has to be noted that also other combinations of first and second feedback loops can be implemented according to the present invention and therefore that it is not limited to the combinations presented on FIGS. 9 and 10.

The combination of both first and second feedback loop allows to create an estimate signal corresponding respectively to an amplitude and a phase estimate of the signal V1 transmitted to a remote equipment. Thus, the subtraction of the amplitude estimate from the signal Vb through the subtracter 11 and the impedance adjustment using the phase estimate allows to retrieve the signal Vr1.

The functioning of the present invention will now be described in details.

In order to ease the understanding of the present invention, the equations of the different signals will be introduced based on sinusoidal signals. As usually in bidirectional transmission, the signal from the local side and the signal from the remote side are no-correlated, so to have this same characteristic for sinusoidal signal, the pulsations of the signals are considered in the description as close but different. The delay is considered equal to a quarter of period of the signal transmitted, that providing a phase delay of $\pi/2$ radian.

$$Vt1 = \cos(\omega_e t)$$

$$Vb = V1 + V2 = A_1 \cos(\omega_e t - \phi_1) + A_2 \cos(\omega_2 t - \phi_2)$$

with $V1 = A_1 \cos(\omega_e t - \phi_1)$ and $V2 = A_2 \cos(\omega_2 t - \phi_2)$ $$Ve = A_e \cos(\omega_e t - \phi_e)$$

$$Vr1 = Vb - ka Ve = A_1 \cos(\omega_e t - \phi_1) + A_2 \cos(\omega_2 t - \phi_2) - ka \cdot A_e \cos(\omega_e t - \phi_e)$$

In which $A_2$, $A_1$ and $A_e$ are amplitude coefficients, $\phi_1$, $\phi_2$ and $\phi_e$ represent phase coefficients.

ka is a coefficient and $\omega_e$ and $\omega_2$ are pulsations.

To insure the no-correlated signal, the pulsations $\omega_e$ and $\omega_2$ are different.

It comes at the output 9c of the first feedback loop 9 the value of ka such as:

$$ka = \frac{1/2\alpha_a A_1 A_e \cos(\varphi_1 - \varphi_e)}{1 + 1/2\alpha_a (A_e)^2}$$

For $\alpha_a \gg 1$, ka becomes $$ka = \frac{A_1}{A_e} \cos(\varphi_1 - \varphi_e) \qquad \text{(equation 1)}$$

With the adjustable impedance Za, the R, C, kp circuit allows to modify the value of the equivalent capacity seen in parallel of the resistance R3.

The equivalent capacity gotten $C_e$ in parallel of R3 is egal to $C(1-kp)$ with $1 > kp > 0$.

$C_e$ associated with R1, R2 and R3 allows to modify the value of the phase $\phi_e$ of Ve. In relationship with the components used the value of the phase $\phi_e$ is such as $\tan \phi_e$ is close to:

$$\tan \phi_e = \lambda(1 - kp) \qquad \text{(equation 2)}$$

in which $\alpha$ is in relationship with R1, R2, R3, C and $\omega_e$

At the output 13d of the second feedback loop 13 the value of kp is such as:

$$kp = \frac{1}{2}\alpha_p ka A_e \sin\phi_e - \frac{1}{2}\alpha_p A_1 \sin\phi_1 \quad \text{(equation 3)}$$

In associating the two equations (equation 2) and (equation 3), kp is equal to:

$$kp = \frac{1/2\alpha_p(kaA_e\lambda\cos\varphi_e - A_1\sin\varphi_1)}{1 + 1/2\alpha_p ka \cdot A_e\lambda\cos\varphi_e}$$

For $\alpha_p \gg 1$, kp becomes $$kp = 1 - \frac{A_1\sin\varphi_1}{kaA_e\lambda\cos\varphi_e}$$

By substituting $ka \cdot A_e$ in the previous equation (equation 1), kp becomes $$kp = 1 - \frac{\sin\varphi_1}{\lambda\cos(\varphi_1 - \varphi_e)\cos\varphi_e}$$

Finally by substituting kp in (equation 2), it comes $$\tan\phi_e = \tan\phi_1$$

so $$\phi_e = \phi_1$$

In consequence, from (equation 1)

$$ka = A_1/A_e$$

By substituting $ka \cdot A_e$ by $A_1$ and $\phi_e$ by $\phi_1$ $ka \cdot Ve$ becomes $$ka \cdot Ve = A_1 \cdot \cos(\omega_e t - \phi_1)$$

As Vr1=Vb−ka·Ve, Vr1 becomes equal to:

$$Vr1 = A_2 \cdot \cos(\omega_e t - \phi_2)$$

The received signal at the output Vr1 of the hybrid circuit is only in relationship with the signal V2 received from a remote equipment. The signal Vr1 is therefore "cancelled" from the part of the signal needed to be transmitted to the remote equipment.

Thus, the present invention allows, thanks to its two complementary feedback loops to cancel a known signal comprised in another signal. It provides a solution efficient on a large range of wires in the target bandwidth. In addition, due to its easy implementation, the present invention could provide a good alternative to upgrade unidirectional transmission into bidirectional transmission in order to multiply by 2 the data-rate on the link for a reduced cost.

I claim:

1. A method for attenuating near-end crosstalk between a remote received signal and a locally transmitted signal in a bidirectional signal transmission wherein said method comprises the step of:
   producing an analog automatic feedback-driven correction loop in order to provide a no-correlation between said transmitted and received signals;
   wherein the step of producing the analog automatic feedback-driven correction loop comprises the steps of:
   creating an amplitude corrected first feedback loop estimate of said locally transmitted signal, wherein said amplitude corrected first feedback loop estimate of said transmitted signal is subtracted from a hybrid signal in order to retrieve said remote received signal; and
   creating a phase corrected second feedback loop estimate of said transmitted signal depending on the amplitude corrected first feedback loop estimate.

2. The method for attenuating near-end crosstalk in accordance with claim 1 wherein said phase corrected second feedback loop estimate of said transmitted signal is used for impedance adjustment.

3. A hybrid circuit for attenuating near-end crosstalk between a remote received signal and a locally transmitted signal in a bidirectional signal transmission comprising
   an input node (Vt1) for signals to be transmitted to a remote equipment,
   an output node (Vr1) for signals received from a remote equipment,
   a hybrid input/output node (Vb) for receiving and transmitting signals from and to a remote equipment,
   a circuit linked to said input, output and hybrid input/output nodes and configured to couple the input node to the hybrid input/output node and to couple the hybrid input/output node to said output, wherein said circuit comprises an analog automatic feedback driven correction loop to provide a no-correlation between said transmitted and received signal;
   wherein said analog automatic feedback driven correction loop comprises:
   means for creating an amplitude corrected first feedback loop estimate of said locally transmitted signal;
   means for subtracting said amplitude corrected first feedback loop estimate of said transmitted signal from a hybrid signal in order to retrieve said remote received signal; and
   means for creating a phase corrected second feedback loop estimate of said transmitted signal depending on the amplitude corrected first feedback loop estimate.

4. The hybrid circuit for attenuating near-end crosstalk in accordance with claim 3 wherein said input node (Vt1) is coupled, on one hand, to the hybrid input/output node (Vb) via an output resistor (Ra) and, on an other hand, to ground via a voltage divider, the voltage divider having a first branch with a first branch resistor (R1) and a second branch coupled to ground and presenting in series a resistor (R2) of said second branch and an adjustable impedance component (Za); said hybrid circuit also comprises:
   a first feedback loop comprising
   first and second inputs coupled respectively to a connection node (Ve) between said first and second branches of said voltage divider and to the hybrid input/output node (Vb), and
   an output coupled to the negative input of a main subtracter, the positive input of said main subtracter being coupled to the hybrid input/output node (Vb) and the output of said main subtracter being coupled to said output node (Vr1) of said hybrid circuit,
   a second feedback loop comprising
   a first input, a second input and third input coupled respectively to the output of the first feedback loop, the input node (Vt1) and to the hybrid input/output node (Vb), and
   an output coupled to the control input of the adjustable impedance component (Za).

5. The hybrid circuit for attenuating near-end crosstalk in accordance with claim 4 wherein the adjustable impedance component (Za) comprises:
   a capacitor (C) in series with a first resistor (R), both being in parallel with a second resistor (R3), said first and second resistors being connected to ground;

a first connection point (Vc) being located between said first resistor (R) and capacitor (C); said adjustable impedance component (Za) also comprises a multiplier with two inputs, one coupled to a second connection point (V3), located between the second branch resistor (R2) of said voltage divider and the adjustable impedance component (Za), and the other one being the control input of said adjustable impedance component (Za) coupled to the output of said second feedback loop, the output of said multiplier being coupled to said first connection point (Vc) located between said first resistor (R) and capacitor (C).

6. The hybrid circuit for attenuating near-end crosstalk in accordance with claim 5 wherein said first feedback loop comprises a subtracter having its positive input coupled to the output of a first multiplier via a first average operator; the inputs of said first multiplier are respectively coupled to said connection node (Ve) between said first and second branches of said voltage divider and said hybrid input/output node (Vb) having its negative input coupled to the output of a second multiplier via a second average operator; the inputs of said second multiplier are coupled respectively to said connection node (Ve) between said first and second branches of said voltage divider and to a third multiplier having its inputs coupled to said connection node (Ve) between said first and second branches of said voltage divider and to the output of said subtracter via a constant operator; the output of said third multiplier being the output of said first feedback loop.

7. The hybrid circuit for attenuating near-end crosstalk in accordance with claim 5 wherein said second feedback loop comprises a subtracter having its negative input coupled to the output of a first multiplier via a first average operator; the inputs of said first multiplier are respectively coupled to the hybrid input/output node (Vb) and to the input node (Vt1) of said hybrid circuit via a delay operator;

having its positive input coupled to a second multiplier via a second average operator; the inputs of said second multiplier are coupled respectively to the output of said first feedback loop and to the input node (Vt1) of said hybrid circuit via said delay operator; the output of said subtracter is coupled to the input of a constant operator; the output of said constant operator is the output of said second feedback loop.

8. The hybrid circuit for attenuating near-end crosstalk in accordance with claim 5 wherein said first feedback loop comprises a subtracter having its positive input coupled to the output of a first multiplier via a first average operator; the inputs of said first multiplier are respectively coupled to said connection node (Ve) between said first and second branches of said voltage divider and said hybrid input/output node (Vb) having its negative input coupled to the output of a second multiplier via a second average operator; the inputs of said second multiplier are coupled respectively to said connection node (Ve) between said first and second branches of said voltage divider and to a third multiplier having its inputs coupled to said connection node (Ve) between said first and second branches of said voltage divider and to the output of said subtracter via a constant operator; the output of said third multiplier is the output of said first feedback loop;

wherein said second feedback loop comprises a subtracter having its negative input coupled to the output of a first multiplier via a first average operator; the inputs of said first multiplier are respectively coupled to the hybrid input/output node (Vb) and to the input node (Vt1) of said hybrid circuit via a delay operator;
having its positive input coupled to a second multiplier via a second average operator; the inputs of said second multiplier are coupled respectively to the output of said first feedback loop and to the input node (Vt1) of said hybrid circuit via said delay operator; the output, of said subtracter is coupled to the input of a constant operator; the output of said constant operator is the output of said second feedback loop;

wherein said first feedback loop comprises a subtracter having its positive input coupled to said hybrid input/output node (Vb) and its negative input coupled to the output of a first multiplier; the output of said subtracter is coupled to the first input of a second multiplier whereas the second input of said second multiplier is coupled to said connection node (Ve) between said first and second branches of said voltage divider; the output of said second multiplier is coupled to a constant operator via an average operator; the output of said constant operator is coupled to the first input of said first multiplier whereas its second input is coupled to said connection node (Ve) between said first and second branches of said voltage divider; the output of said first multiplier is also the output of said first feedback loop;

wherein said second feedback loop comprises a subtracter having its positive input coupled to the output of said first feedback loop and its negative input coupled to said hybrid input/output node (Vb); the output of said subtracter is coupled to the first input of a multiplier whereas the second input of said multiplier is coupled to the input node (Vt1) of said hybrid circuit via a delay operator; the output of said multiplier is coupled to a constant operator via an average operator; the output of said constant operator is also the output of said second feedback loop.

9. The hybrid circuit for attenuating near-end crosstalk in accordance with claim 4 wherein said first feedback loop comprises a subtracter having its positive input coupled to the output of a first multiplier via a first average operator; the inputs of said first multiplier are respectively coupled to said connection node (Ve) between said first and second branches of said voltage divider and said hybrid input/output node (Vb) having its negative input coupled to the output of a second multiplier via a second average operator; the inputs of said second multiplier are coupled respectively to said connection node (Ve) between said first and second branches of said voltage divider and to a third multiplier having its inputs coupled to said connection node (Ve) between said first and second branches of said voltage divider and to the output of said subtracter via a constant operator; the output of said third multiplier being the output of said first feedback loop.

10. The hybrid circuit for attenuating near-end crosstalk in accordance with claim 9 wherein said second feedback loop comprises a subtracter having its negative input coupled to the output of a first multiplier via a first average operator; the inputs of said first multiplier are respectively coupled to the hybrid input/output node (Vb) and to the input node (Vt1) of said hybrid circuit via a delay operator;

having its positive input coupled to a second multiplier via a second average operator; the inputs of said second multiplier are coupled respectively to the output of said first feedback loop and to the input node (Vt1) of said hybrid circuit via said delay operator; the output of said subtracter is coupled to the input of a constant operator; the output of said constant operator is the output of said second feedback loop.

11. The hybrid circuit for attenuating near-end crosstalk in accordance with claim 10 wherein said first feedback loop comprises a subtracter having its positive input coupled to said hybrid input/output node (Vb) and its negative input coupled to the output of a first multiplier; the output of said subtracter is coupled to the first input of a second multiplier whereas the second input of said second multiplier is coupled to said connection node (Ve) between said first and second branches of said voltage divider; the output of said second multiplier is coupled to a constant operator via an average operator; the output of said constant operator is coupled to the first input of said first multiplier whereas its second input is coupled to said connection node (Ve) between said first and second branches of said voltage divider; the output of said first multiplier is also the output of said first feedback loop.

12. The hybrid circuit for attenuating near-end crosstalk in accordance with claim 11 wherein said second feedback loop comprises a subtracter having its positive input coupled to the output of said first feedback loop and its negative input coupled to said hybrid input/output node (Vb); the output of said subtracter is coupled to the first input of a multiplier whereas the second input of said multiplier is coupled to the input node (Vt1) of said hybrid circuit via a delay operator; the output of said multiplier is coupled to a constant operator via an average operator; the output of said constant operator is also the output of said second feedback loop.

13. The hybrid circuit for attenuating near-end crosstalk in accordance with claim 10 wherein said second feedback loop comprises a subtracter having its positive input coupled to the output of said first feedback loop and its negative input coupled to said hybrid input/output node (Vb); the output of said subtracter is coupled to the first input of a multiplier whereas the second input of said multiplier is coupled to the input node (Vt1) of said hybrid circuit via a delay operator; the output of said multiplier is coupled to a constant operator via an average operator; the output of said constant operator is also the output of said second feedback loop.

14. The hybrid circuit for attenuating near-end crosstalk in accordance with claim 4 wherein said second feedback loop comprises a subtracter
having its negative input coupled to the output of a first multiplier via a first average operator; the inputs of said first multiplier are respectively coupled to the hybrid input/output node (Vb) and to the input node (Vt1) of said hybrid circuit via a delay operator;
having its positive input coupled to a second multiplier via a second average operator; the inputs of said second multiplier are coupled respectively to the output of said first feedback loop and to the input node (Vt1) of said hybrid circuit via said delay operator; the output of said subtracter is coupled to the input of a constant operator; the output of said constant operator is the output of said second feedback loop.

15. The hybrid circuit for attenuating near-end crosstalk in accordance with claim 1 wherein said first feedback loop comprises a subtracter having its positive input coupled to said hybrid input/output node (Vb) and its negative input coupled to the output of a first multiplier; the output of said subtracter is coupled to the first input of a second multiplier whereas the second input of said second multiplier is coupled to said connection node (Ve) between said first and second branches of said voltage divider; the output of said second multiplier is coupled to a constant operator via an average operator; the output of said constant operator is coupled to the first input of said first multiplier whereas its second input is coupled to said connection node (Ve) between said first and second branches of said voltage divider; the output of said first multiplier is also the output of said first feedback loop.

16. The hybrid circuit for attenuating near-end crosstalk in accordance with claim 4 wherein said second feedback loop comprises a subtracter having its positive input coupled to the output of said first feedback loop and its negative input coupled to said hybrid input/output node (Vb); the output of said subtracter is coupled to the first input of a multiplier whereas the second input of said multiplier is coupled to the input node (Vt1) of said hybrid circuit via a delay operator; the output of said multiplier is coupled to a constant operator via an average operator; the output of said constant operator is also the output of said second feedback loop.

* * * * *